United States Patent
Law et al.

(10) Patent No.: US 8,949,665 B2
(45) Date of Patent: Feb. 3, 2015

(54) INTEGRATED BUS CONTROLLER AND POWER SUPPLY DEVICE FOR USE IN A PROCESS CONTROL SYSTEM

(75) Inventors: Gary Keith Law, Georgetown, TX (US); Kent Allen Burr, Round Rock, TX (US); Michael L. Marshall, Georgetown, TX (US); Michael Kessler, Laudenbach (DE)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 488 days.

(21) Appl. No.: 12/873,853

(22) Filed: Sep. 1, 2010

(65) Prior Publication Data

US 2011/0131455 A1 Jun. 2, 2011

Related U.S. Application Data

(60) Provisional application No. 61/238,967, filed on Sep. 1, 2009.

(51) Int. Cl.
*G06F 11/00* (2006.01)
*H04B 3/54* (2006.01)
(Continued)

(52) U.S. Cl.
CPC .......... *H04B 3/548* (2013.01); *H04L 12/40013* (2013.01); *H04L 25/0278* (2013.01); *H04L 25/0298* (2013.01); *H04B 2203/5458* (2013.01); *H04L 25/0266* (2013.01)
USPC .......................................... 714/22; 714/47.1

(58) Field of Classification Search
USPC ......................................................... 714/22
See application file for complete search history.

(56) References Cited

U.S. PATENT DOCUMENTS 4,607,330 A * 8/1986 McMurray et al. ............. 714/14
5,892,893 A * 4/1999 Hanf et al. ........................ 714/3
(Continued)

FOREIGN PATENT DOCUMENTS

EP 2 228 943 A1 9/2010
JP 2007-134803 A 5/2007

OTHER PUBLICATIONS

Search Report for Application No. GB1014508.4, dated Dec. 14, 2010.
(Continued)

*Primary Examiner* — Sarai Butler
(74) *Attorney, Agent, or Firm* — Marshall, Gerstein & Borun LLP

(57) ABSTRACT

An integrated bus controller and power supply device includes a typical or standard bus controller and a bus power supply disposed in a common housing, the size and external configuration of which may match a standard bus controller device associated with a typical I/O communication network. The bus controller may store and implement one or more control routines using one or more field devices connected to the I/O communication network while the bus power supply generates and provides the appropriate power signal to the bus of the I/O communication network, the power signal being used to power the field devices connected to the I/O communication network. The integrated bus controller and power supply device can be easily connected to the bus of the I/O communication network to provide both bus controller functionality and bus power supply functionality on the I/O communication network, without the need of configuring and attaching separate, dedicated bus controller and power supply devices to the bus and having to wire these devices together using multiple different terminal blocks.

42 Claims, 11 Drawing Sheets

(51) Int. Cl.
*H04L 12/40* (2006.01)
*H04L 25/02* (2006.01)

(56) References Cited

U.S. PATENT DOCUMENTS

| | | | |
|---|---|---|---|
| 6,542,948 B1* | 4/2003 | Munz et al. | 710/110 |
| 6,757,774 B1* | 6/2004 | Benson et al. | 710/305 |
| 7,401,274 B2* | 7/2008 | Parker | 714/724 |
| 8,006,121 B1* | 8/2011 | Samoilova et al. | 714/2 |
| 2002/0196050 A1* | 12/2002 | Nygren | 326/30 |
| 2003/0074498 A1* | 4/2003 | Gareis et al. | 710/36 |
| 2003/0132669 A1* | 7/2003 | Bahl et al. | 307/52 |
| 2005/0066220 A1* | 3/2005 | Gale et al. | 714/4 |
| 2005/0104734 A1 | 5/2005 | Graube | |
| 2005/0182501 A1* | 8/2005 | Franchuk et al. | 700/81 |
| 2006/0041783 A1* | 2/2006 | Rabinovitz | 714/6 |
| 2006/0168483 A1* | 7/2006 | Sherlock et al. | 714/43 |
| 2007/0285851 A1* | 12/2007 | Hillman | 361/18 |
| 2007/0293954 A1 | 12/2007 | Pfingsten et al. | |
| 2008/0162988 A1* | 7/2008 | Zorek et al. | 714/13 |
| 2008/0163006 A1* | 7/2008 | Apel et al. | 714/43 |
| 2009/0138740 A1* | 5/2009 | Fan | 713/340 |
| 2009/0322310 A1* | 12/2009 | Whittington et al. | 324/74 |

OTHER PUBLICATIONS

Japanese Office Action for Application No. JP 2010-195500, dated Jan. 28, 2014.
Chinese Office Action for Application No. CN 201010569812.X, dated Feb. 28, 2014.

* cited by examiner

INTEGRATED BUS CONTROLLER AND POWER SUPPLY DEVICE FOR USE IN A PROCESS CONTROL SYSTEM

RELATED APPLICATIONS

This application is a regularly filed application from, and claims priority to and the benefit of the filing date of U.S. Provisional Patent Application No. 61/238,967, entitled "Integrated Bus Controller and Power Supply Device for Use in a Process Control System," which was filed on Sep. 1, 2009, the entire disclosure of which is hereby expressly incorporated by reference herein.

TECHNICAL FIELD

This patent relates generally to bus based process communication systems used to perform process control operations in a process plant or other process, and more particularly to an integrated bus controller and bus based power supply for use in a process control communication system.

BACKGROUND

Process control systems are widely used in factories and/or process plants in which products are manufactured or processes are controlled (e.g., chemical manufacturing, power plant control, oil refinery, etc.) to produce a product of some sort. Process control systems are also used in the harvesting of natural resources such as, for example, oil and gas drilling and handling processes, etc. Virtually any manufacturing process, resource harvesting process, etc. can be automated through the application of one or more process control systems.

The manner in which process control systems are implemented has evolved over the years. Older generations of process control systems were typically implemented using dedicated, centralized hardware. However, modern process control systems are typically implemented using a highly distributed network of workstations, intelligent controllers, smart field devices, and the like, some or all of which may perform a portion of an overall process control strategy or scheme. In particular, most modern process control systems include smart field devices and other process control components that are communicatively coupled to each other and/or to one or more process controllers via one or more digital or combined digital and analog data busses. Of course, many of these modern process control systems may also include non-smart field devices such as, for example, 4-20 milliamp (MA) devices, 0-10 volts direct current (VDC) devices, etc., which are typically directly coupled to controllers, as opposed to using a shared digital data bus or the like.

More particularly, modern process control systems, such as distributed or scalable process control systems, typically include one or more process controllers communicatively coupled to each other, to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, and uses this information to implement one or more control routines to generate control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

Some process control systems, such as the DeltaV™ system sold by Emerson Process Management, use function blocks or groups of function blocks, referred to as modules, located in the process controller or in different field devices or input/output (I/O) controller devices to perform control operations. In these cases, the process controller or other device is capable of including and executing one or more function blocks or modules, each of which receives inputs from and/or provides outputs to other function blocks (either within the same device or within different devices), and performs some process control operation, such as measuring or detecting a process parameter, controlling a device, or performing a control operation, such as implementing a proportional-derivative-integral (PID) control routine. The different function blocks and modules within a process control system are generally configured to communicate with each other (e.g., over a bus) to form one or more process control loops.

In many cases, process controllers are programmed to execute a different algorithm, sub-routine or control loop (which are all control routines) for each of a number of different loops defined for, or contained within a process, such as flow control loops, temperature control loops, pressure control loops, etc. Generally speaking, each such control loop includes one or more input blocks, such as an analog input (AI) function block, a control block, such as a proportional-integral-derivative (PID) or a fuzzy logic control function block, and an output block, such as an analog output (AO) function block. Control routines, and the function blocks that implement such routines, have been configured in accordance with a number of control techniques including, for example, PID control, fuzzy logic control, and model-based control techniques such as a Smith predictor or model predictive control (MPC).

This increased amount of controller functionality results in increased levels of data transfer that must occur between different devices within a process control system to support the controller functionality. Thus, one particularly important aspect of modern process control system design involves the manner in which field devices are communicatively coupled to each other, to the process controllers and to other systems or devices within a process control system or a process plant. In general, the various communication channels, links and paths that enable the field devices to function within the process control system are commonly collectively referred to as an input/output (I/O) communication network.

The communication network topology and physical connections or paths used to implement an I/O communication network can have a substantial impact on the robustness or the integrity of field device communications, particularly when the I/O communication network is subjected to environmental factors or conditions associated with the process control system. For example, many industrial control applications often subject field devices and their associated I/O communication networks to harsh physical environments (e.g., high, low or highly variable ambient temperatures, vibrations, corrosive gases or liquids, etc.), difficult electrical environments (e.g., high noise environments, poor power quality, and transient voltages), etc. As a result, numerous different types of I/O communication networks and communication protocols have been developed to be used to provide communications on those networks.

More particularly, to support the execution of the control routines in a distributed process control system, a typical industrial or process plant has a centralized control room that is communicatively connected with one or more of the distributed process controllers and process I/O subsystems which, in turn, are connected to the one or more field devices that perform control activities within the plant, such as measuring process variables or performing physical actions in the plant (e.g., opening or closing a valve). Traditionally, analog field devices have been connected to the controller by two-wire or four-wire current loops for both signal transmission and the supply of power. An analog field device that transmits a signal to the control room (e.g., a sensor or a transmitter) modulates the current running through the current loop, such that the current is proportional to the sensed process variable. On the other hand, analog field devices that perform an action under control of the control room are controlled by the magnitude of the current through the loop.

More recently however, process control communication systems have been developed that superimpose digital data on the current loop used to transmit the analog signals. For example, the Highway Addressable Remote Transducer (HART®) protocol uses the loop current magnitude to send and receive analog signals, but also superimposes a digital carrier signal on the current loop signal to enable two-way field communication with smart field instruments. Still further, other protocols have been developed that provide all digital communications on a bus associated with an I/O communication network. For example, the FOUNDATION® Fieldbus protocol, which is generally referred to as the Fieldbus protocol, provides all digital communications on a bus associated with an all-digital I/O communication network. The Fieldbus protocol actually includes two sub-protocols, including the H1 protocol which supports data transfers at a rate up to 31.25 kilobits per second while powering field devices coupled to the network, and the H2 protocol which supports data transfers at a rate up to 2.5 megabits per second but without providing power to the field devices via the bus. With these types of communication protocols, smart field devices, which are typically all digital in nature, support a number of maintenance modes and enhanced functions not provided by older control systems. However, these digital based communication protocols also typically require a bus controller device, sometimes referred to as a link controller device, to assure proper communications on the bus, to interface to external devices, such as process controllers and user interface devices that are not attached to the I/O communication network, etc.

As noted above, some of the I/O communication networks and the protocols associated with these networks have been developed to provide power to the field devices connected to the network bus in addition to communicating digital and/or analog signals on the network bus. Providing power on the network bus (referred to herein as bus power) enables the I/O communication network itself to power the field devices and other devices connected to the I/O communication network, thereby eliminating the need to provide a separate power source for each field device, controller, etc. connected to the I/O communication network. This feature is very useful in process control systems that are implemented outdoors, in harsh environments, or in remote or not easily accessible locations. However, the bus power feature is also very useful in enclosed plants and other more traditional locations, as it reduces the cabling and wiring needed to provide separate power signals to each of the field devices within a process control system.

Typically, I/O communication networks that provide bus power include a separate power module or power supply device that is connected to the bus to place the appropriate power signal onto the bus to be used to power the other devices connected to the bus. In some cases, such as in the Fieldbus H1 protocol, the power supply may be redundant in nature and may be isolated from the bus by an impedance network that prevents the power supply from interfering with the flow of digital signals on the network bus. Thus, in many instances, the configuration of an I/O communication network that provides bus power requires that separate power supply devices be connected to the bus, in addition to the bus controller and the field devices connected to the bus, to be able to provide power on the bus. These systems may also require additional devices disposed between the power supply devices and the bus to isolate the power supplies from the digital communications on the network bus. These requirements lead to additional hardware and wiring being needed for the I/O communication network, require additional space in the cabinets which house the hardware for the I/O communication network, and require additional configuration and wiring activities when setting up and configuring the I/O communication network. Moreover, the additional set up and configuration procedures, which generally entail setting up and wiring hardware together to create the I/O communication network, lead to more errors and potential problems in the implementation and running of a particular I/O communication network.

SUMMARY OF THE DISCLOSURE

An integrated bus controller and power supply device includes a typical or standard bus controller and a bus power supply disposed in a common housing, the size and external configuration of which may match a standard bus controller device associated with a typical I/O communication network. The bus controller of the integrated device may store and implement one or more protocol or communication control routines to enforce or ensure proper communications occur on the bus between the one or more devices, e.g., field devices, connected to the I/O communication network, while the bus power supply of the integrated device generates and provides the appropriate power signal for the bus of the I/O communication network, the power signal being used to power the devices connected to the I/O communication network. The integrated bus controller and power supply device can be easily connected to the bus of the I/O communication network to provide both bus controller functionality and bus power supply functionality for the I/O communication network, without the need of configuring and attaching separate, dedicated bus controller and power supply devices to the bus and having to wire those devices together using multiple terminal blocks.

The integrated bus controller and power supply device can be configured in a number of different manners, each of which enables the device to be used in a simplex configuration, in which only one integrated bus controller and power supply device is connected to a particular I/O communication network, or in a redundant configuration, in which two integrated bus controller and power supply devices are connected to a particular I/O communication network to provide redundancy of both bus or protocol controller functionality and power supply functionality for the I/O communication network. Additionally, a simplified terminal block may be used to simultaneously connect one or multiple integrated bus controller and power supply devices to an I/O communication network in either a simplex or redundant configuration.

The use of the integrated bus controller and power supply device with its associated features reduces the hardware and wiring needed for an I/O communication network that includes bus power, reduces the configuration and set up activities needed to set up and configure a bus powered I/O communication network, and reduces the cabinetry space needed for or associated with a typical bus powered I/O communication network. Still further, the integrated bus controller and power supply device makes setting up redundant functionality in an I/O communication network much more easy, as it provides redundancy of both controller functionality and power supply functionality with two basic devices and a single terminal block, instead of needing at least four basic devices and multiple terminal blocks, as is typically needed in prior art systems.

DETAILED DESCRIPTION

Figure 1:
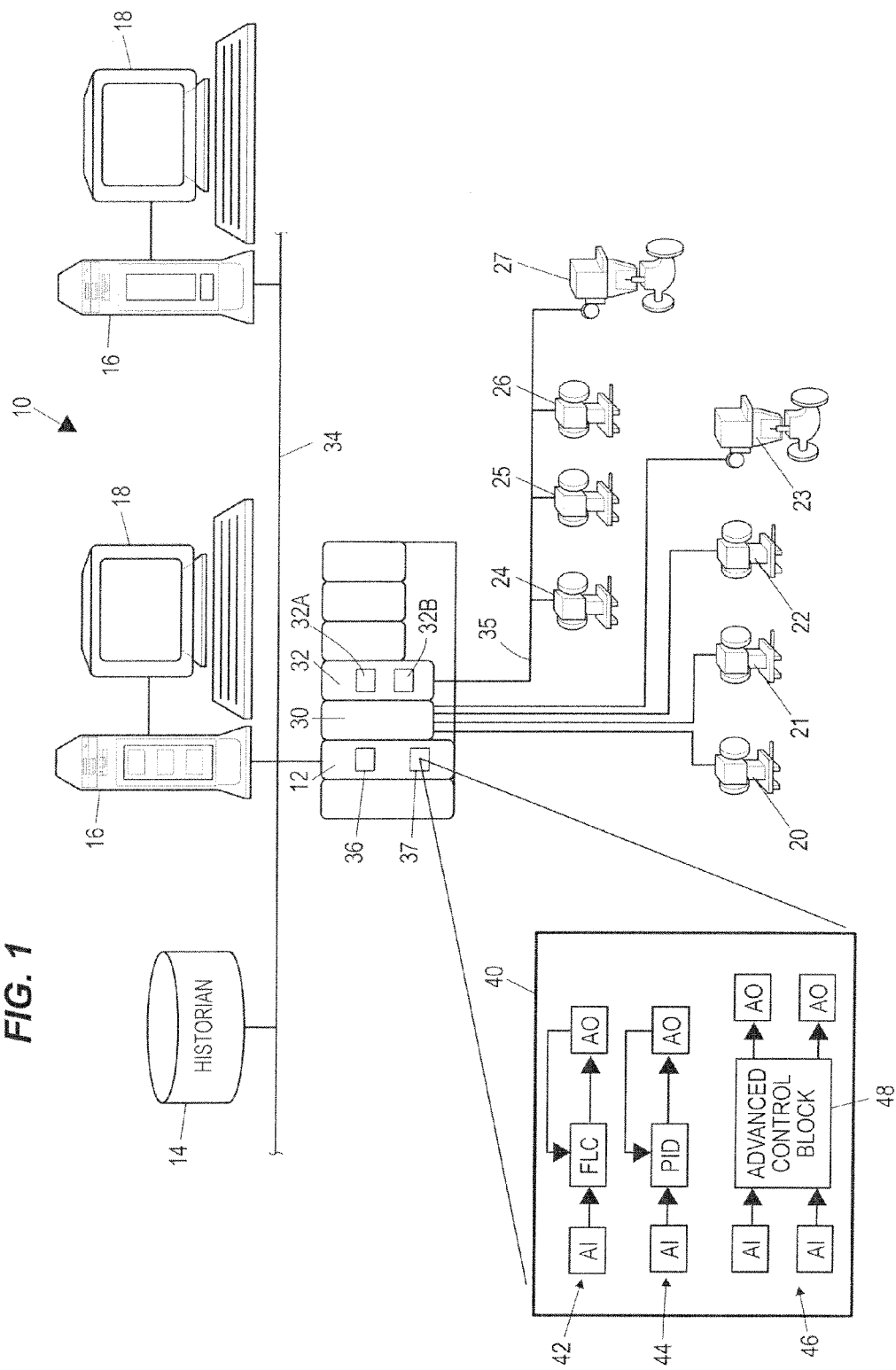
FIG. 1 is a schematic representation of a process control system including a bus or protocol controller configured with one or more routines to control communications between field devices and other devices in an I/O communication network of the process control system.

Referring now to FIG. 1, a process control system 10 includes a process controller 12 connected to a data historian 14 and to one or more host workstations or computers 16 (which may be any type of personal computers, workstations, etc.), each having a display screen 18. The controller 12 is also connected to field devices 20-27 via input/output (I/O) devices 30 and 32, which are also referred to herein as bus controller devices or protocol controller devices. The data historian 14 may be any desired type of data collection and storage unit having any desired type of memory and any desired or known software, hardware or firmware for storing data. The data historian 14 may be separate from (as illustrated in FIG. 1) or may be a part of one of the workstations 16. The controller 12, which may be, by way of example, the DeltaV™ controller sold by Emerson Process Management, is communicatively connected to the host computers 16 and to the data historian 14 via, for example, an Ethernet connection or any other desired communication network 34. The controller 12 is also communicatively connected to the field devices 20-27 via the bus controller devices 30 and 32 using any desired hardware and software associated with, for example, standard 4-20 ma devices and/or any smart communication protocol such as the FOUNDATION® Fieldbus protocol, the HART® protocol, etc. In one example, the controller 12 is coupled to the bus controller devices 30 and 32 via a backplane connection or bus (not shown in FIG. 1) which may also provide power to the devices 30 and 32.

The field devices 20-27 may be any types of devices, such as sensors, valves, transmitters, positioners, etc., while the I/O or bus controller devices 30 and 32 may be any types of I/O devices conforming to any desired communication or controller protocol. In the embodiment illustrated in FIG. 1, the field devices 20-23 are standard 4-20 ma devices or are HART devices that communicate over analog lines or combined analog and digital lines to the I/O device 30, while the field devices 24-27 are smart devices, such as Fieldbus field devices, that communicate over a digital bus 35 to the I/O device 32 using Fieldbus protocol communications. In this case, the I/O device or bus controller device 32 includes a processor 32A and stores one or more bus controller routines in a memory 32B which, when run on the processor, enables the device 32 to oversee and enforce communication rules on the bus 35 associated with the Fieldbus protocol. In this case, the device 32 operates to implement a Fieldbus stack, and may execute as a link active scheduler (LAS) for the Fieldbus bus 35 according to the Fieldbus protocol. Of course, the field devices 20-27 could conform to any other desired standard(s) or protocols, including any standards or protocols developed in the future. Moreover, field devices 20-27 may be, for example, input devices (e.g., devices such as sensors that provide status signals that are indicative of measured process variables such as, for example, temperature, pressure, flow rate, etc.), or control operators or actuators that perform physical actions in response to commands received from controllers and/or other field devices. For example, a controller may send signals to a valve to increase pressure or flow, to a heater or chiller to change a temperature, to a mixer to agitate ingredients in a process control system, etc.

The controller 12 includes a processor 36 that implements or oversees one or more process control routines (stored in a memory 37), which may include control loops, stored therein or otherwise associated therewith and communicates with the devices 20-27, the host computers 16 and the data historian 14 to control a process in any desired manner. It should be noted that any control routines or modules described herein may have parts thereof implemented or executed by different controllers or other devices if so desired. Likewise, the control routines or modules described herein to be implemented within the process control system 10 may take any form, including software, firmware, hardware, etc. For the purpose of this disclosure, a process control module may be any part or portion of a process control system including, for example, a routine, a block or any element thereof, stored on any computer readable medium. Control routines, which may be modules or any part of a control procedure such as a subroutine, parts of a subroutine (such as lines of code), etc., may be implemented in any desired software format, such as using object oriented programming, using ladder logic, sequential function charts, function block diagrams, or using any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the process controller 12 may be configured to implement a control strategy or control routine in any desired manner.

In some embodiments, the process controller 12 implements a control strategy using what are commonly referred to as function blocks, wherein each function block is an object or other part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist. Function blocks may be stored in and executed by the controller 12, which is typically the case when these function blocks are used for, or are associated with standard 4-20 ma devices and some types of smart field devices such as HART and Fieldbus devices, or may be stored in and implemented by the field devices themselves, which can be the case with Fieldbus devices.

As illustrated by the exploded block 40 of FIG. 1, the process controller 12 may include a number of single-loop control routines, illustrated as routines 42 and 44, and, if desired, may implement one or more advanced control loops, illustrated as a control loop 46. Each such loop is typically referred to as a control module. The single-loop control routines 42 and 44 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 46 is illustrated as including an advanced control block 48 having multiple inputs communicatively connected to AI function blocks and multiple outputs communicatively connected to AO function blocks, although the inputs and outputs of the advanced control block 48 may be connected to any other desired function blocks or control elements to receive other types of inputs and to provide other types of control outputs. It will be understood that the function blocks illustrated in FIG. 1 can be executed by the process controller 12 or, alternatively, can be located in and executed by any other processing device, such as the bus controller device 32 associated with the Fieldbus network 35, or even one of the field devices 24-27.

Figure 2:
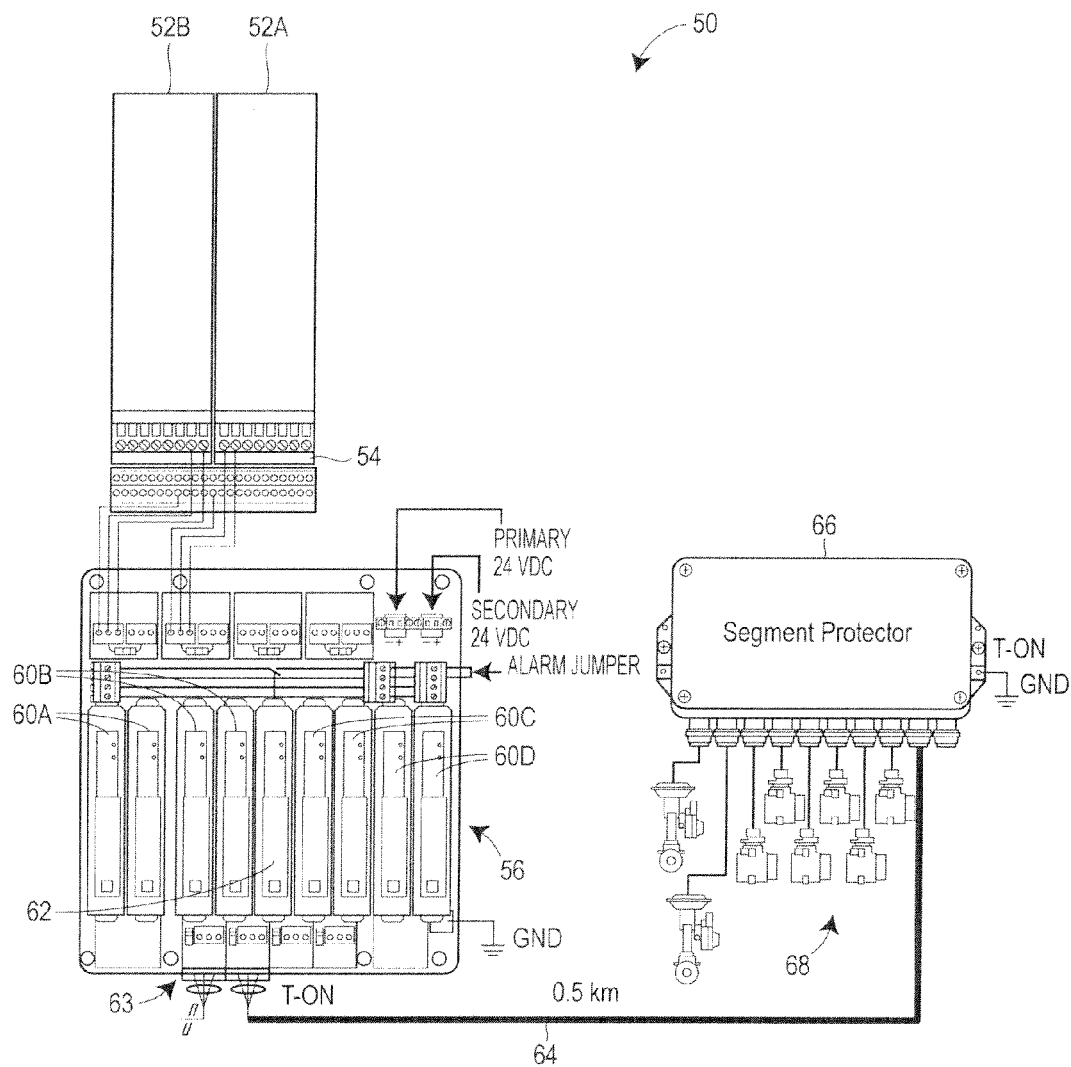
FIG. 2 depicts a detailed diagram of a manner in which a prior art bus controller and prior art power supply module are connected to an I/O communication network of a process control system, such as that of FIG. 1.

FIG. 2 illustrates a prior art network configuration 50 in which one or more bus controller devices 52 are connected through a terminal block 54 to a power supply module 56 which, in turn, is configured to supply bus power to one or more bus based communication networks, such as one or more FOUNDATION® Fieldbus H1 segments. Here, the bus controller devices 52 may operate as the I/O device 32 of FIG. 1. As shown in FIG. 2, a pair of, in this case, Fieldbus H1 bus controller devices 52A and 52B, are connected to the terminal block 54 via a backplane connection, not shown in FIG. 2. The bus controllers 52A and 52B may be typical standard H1 bus controllers made by any manufacturer including, for example, Emerson Process Management, and the outputs of the bus controllers 52A and 52B are connected through the terminal block 54 to an input block of the power supply module 56 via external wired connections. The power supply module 56 shown in FIG. 2 includes four sets of redundant power supplies which are configured to operate or provide redundant power to four separate and different Fieldbus segments. Here, the redundant sets of power supplies are identified as power supply pairs 60A, 60B, 60C and 60D. Moreover, the power supply module 56 includes a separate diagnostics module card 62, which monitors and provides diagnostics with respect to the operation of the power supplies 60A-60D.

The power supply module 56 also includes a set of four output terminals on a terminal block 63, and one of the sets of output terminals is used to connect the controller 52A to an I/O communication network bus 64 having a segment protector 66 and field devices 68 connected thereto. The terminal block 63 or the power supplies 60A-60D may include a bus isolation device which operates to isolate the direct current (DC) power supplied by the power supplies 60A-60D from the digital signals on the bus 64. Moreover, as illustrated in FIG. 2, a primary 24 volt DC power connection and a secondary 24 volt DC power connection are provided to supply raw power to the power supply module 56, and this raw power is used by the power supplies 60A-60D to provide proper voltage and current signals to the one or more Fieldbus segments, including the Fieldbus segment 64 associated with the segment protector 66. The Fieldbus segment protector 66 operates to protect the segment 64 in case of a fault on the segment 64, such as a short circuit or an open circuit in or at one of the field devices 68 connected to the segment protector 66.

As will be understood, the power supply module 56, and in particular, one of the redundant sets of power supplies 60A-60D, provides power on the Fieldbus segment 64 associated with the segment protector 66. Additionally the power supply module 56 connects the H1 bus controller 52A to the segment bus 64 to enable powering of and control of the field devices 68 on the segment 64. In this case, the field devices 68 are illustrated as FOUNDATION® Fieldbus compliant field devices, although the network 64 could be associated with and use other types of devices and communication protocols including, for example, Actuator Sensor Interface (ASI), DeviceNet, etc. In this prior art configuration, however, the bus powered Fieldbus communication network 64 uses a power supply module 56 that is separate from the segment protector 66, the field devices 68 and the H1 bus controller cards 52A and 52B. Moreover, this configuration requires that the bus controllers 52A and 52B be connected through a first output terminal block 54 associated with the controller cards 52A and 52B to the input terminal block of the power supply module 56, and that these bus controllers 52A and 52B then be connected to one or more of the Fieldbus segments, such as the segment 64, through the output terminal block 63 on the power supply module 56. As a result, this configuration requires separate installation spaces (e.g., cabinetry space) for each of the different bus controller cards 52A and 52B, the power supply module 56 and the terminal blocks 54 and 63. Moreover, this set up requires complicated configuration procedures and configuration activities when installing and configuring the bus based communication system associated with, for example, the Fieldbus segment 64. Additionally, to connect the bus controllers 52A and 52B and the power supplies 60A, 60B, 60C or 60D in a redundant configuration to provide redundancy on the segment 64, the bus controller cards 52A and 52B must be wired individually for redundancy, and two of the sets of power supplies 60A-60D and the diagnostics module 62 must also be set up and wired individually to provide redundancy on the segment 64.

Figure 3:
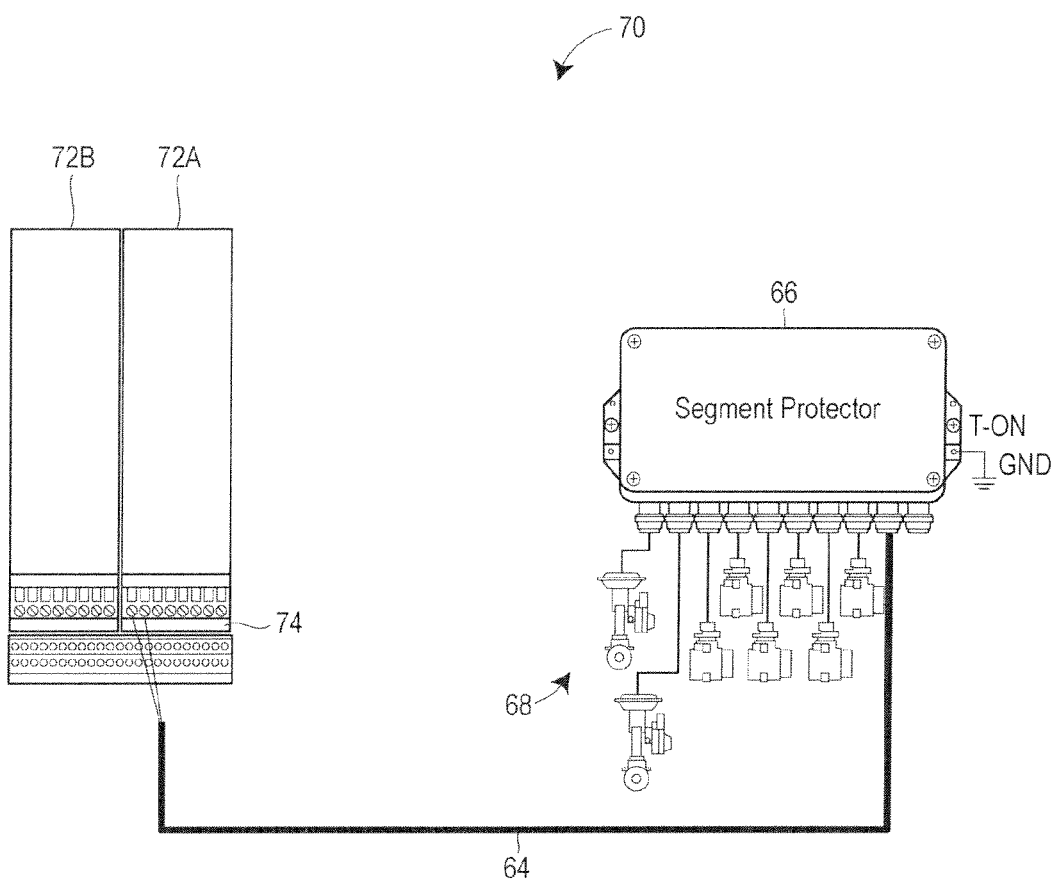
FIG. 3 depicts a diagram of a manner in which an integrated bus controller and power supply device can be connected to an I/O communication network of a process control system, such as that of FIG. 1.

FIG. 3 illustrates a new I/O communication network configuration 70 for use in providing bus or protocol control and power on the bus powered I/O communication network 64. As illustrated in FIG. 3, the network configuration 70 includes one or more integrated bus controller and power supply devices 72A and 72B connected to a single terminal block 74. Here, the terminal block 74 is connected directly to the Fieldbus segment 64 which is, in turn, connected to the field devices 68 via the segment protector 66. In this case, the Fieldbus segment 64 receives both power (generated using power supply functionality of the device 72A) and bus or communication control signals (generated using the bus controller functionality of the device 72A) from the integrated bus controller and power supply device 72A, without the need for a separate power module and power supply module terminal block. More particularly, the communication network configuration 70 of FIG. 3 includes integrated bus controller and power supply devices 72A and 72B, each of which includes power supply and bus controller functionality (such as that provided by the I/O device 32 of FIG. 1) integrated therein, and at least one of which is connected to the Fieldbus segment 64 directly through the terminal block 74. As a result, the communication network configuration 70 requires reduced cabinet space and reduces the wiring and hardware costs associated with setting up a communication network, while making setup and configuration of the network 64 easier. The network configuration 70 also simplifies and potentially improves bus diagnostics on the network or segment 64 because of the reduced hardware and wiring associated with the network configuration 70.

Figure 4:
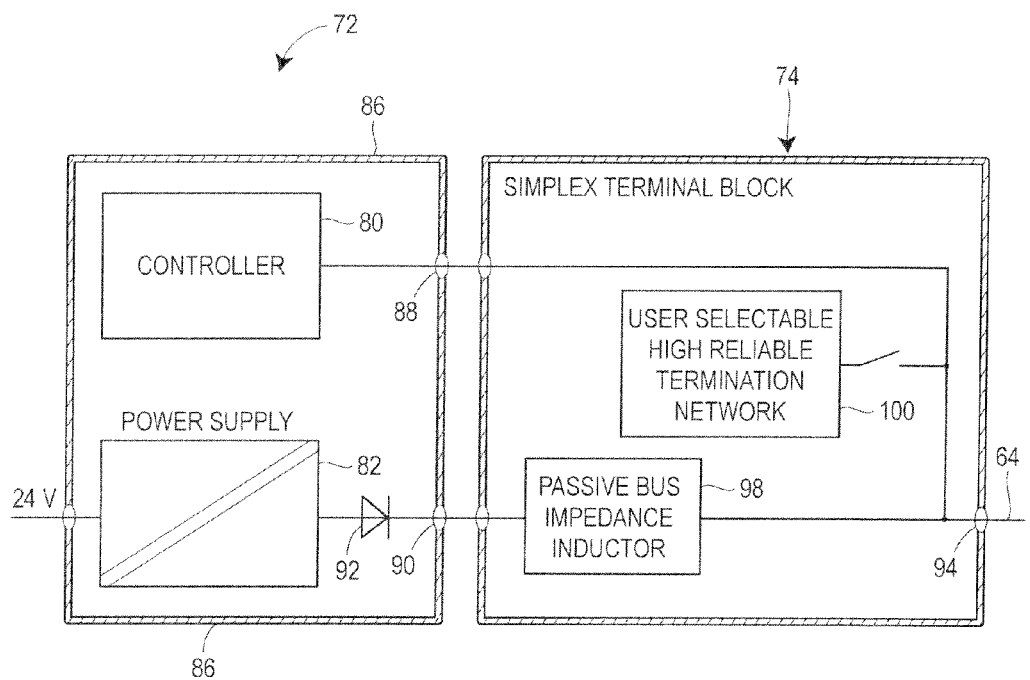
FIG. 4 depicts a block diagram of one example of an integrated bus controller and power supply device connected to a terminal block.

FIG. 4 illustrates a generalized block diagram of one of the integrated bus controller and power supply devices 72A and 72B of FIG. 3 (referenced in FIG. 4 as the device 72), in conjunction with the terminal block 74. In this case, the integrated bus controller and power supply device 72 includes circuitry and functionality of both a bus controller 80 (which may be an H1 Fieldbus bus controller) and a power supply 82 disposed inside of a common or single housing 86 associated with the device 72. As illustrated in FIG. 4, the bus controller 80 provides control functionality via, and may send and receive signals to and from, an input/output terminal 88 disposed through the housing 86. The bus controller 80 may include typical bus controller circuitry implemented in any known type of bus or protocol control device, such as in an H1 bus controller device, and may include known bus controller circuitry such as that provided in Emerson Process Management Fieldbus H1 bus controller cards. Although it is not necessary, the bus controller 80 and the circuitry associated therewith may be disposed on one printed circuit board (PCB) disposed within the housing 86 while the power supply 82 and its associated circuitry may be disposed on a second PCB board disposed within the housing 86. In any case, the bus controller 80 includes communication routines and data that are used to oversee, enforce and/or implement particular protocol based communications on the network bus (such as the bus 64). In the case in which the bus controller 80 is a Fieldbus controller device, the bus controller 80 may implement one or more Fieldbus stacks and, if desired, operate as the Fieldbus link active scheduler on the bus 64 to thereby implement Fieldbus communications on the bus 64. Likewise, if desired, the bus controller 80 may include a memory that can store process control routines downloaded to the device 72 for use in performing process control activities, and may, for example, store and execute any of the function blocks of the control modules 42, 44, 46 of FIG. 1.

As illustrated in FIG. 4, the power supply 82 receives, for example, a 24 volt DC power signal from an external source and includes typical or known circuitry that produces bus power needed by the network or segment 64. The output of the power supply 82 is connected to an output terminal 90 disposed through the housing 86 via a redundancy device 95, which may be in the form of an "or"-ing network implemented by a power diode 92, for example. While not specifically illustrated in FIG. 4, the power supply 82 may actually include two separate power supplies mounted on, for example, the same PCB to provide associated power supply functionality for two different I/O communication channels (e.g., for two separate Fieldbus segments or networks). Still further, the primary bus controller 80 may include a single processor (not shown) along with associated bus controller circuitry (such as media access units) associated with two separate or different bus controller channels, which share the processor, but that provide bus controller functionality for two different networks or segments. Thus, in this case, the integrated bus controller and power supply 72 may provide independent power and controller functionality for two different channels (i.e., for two different networks or segments), such as for two different Fieldbus H1 segments.

In any event, as illustrated in FIG. 4, the terminal block 74 includes a first input connected to the controller output terminal 88 and a second input connected to the power supply output terminal 90. Circuitry within the terminal block 74 combines the power line from the power supply 82 and the control line from the controller 80 of the integrated bus controller and power supply device 72 at a single output 94 of the terminal block 74, thereby placing controller and field device communication signals together with a bus power signal on the network bus 64 connected to the terminal or output 94.

Moreover, an impedance device 98 is disposed within the terminal block 74 and is connected between the diode 92 and the output 94 of the terminal block 74 to provide isolation between the power supply 82 and the segment or bus 64. Generally speaking, the impedance device 98 isolates the higher frequency signals on the network 64 from the power supply 82, to prevent the power supply 82, which may be a voltage controlled power supply, from absorbing or canceling the digital signals on the network 64. The impedance device 98 may be, for example, an active component such as an active gyrator network, or a may be a passive component such as an inductor or a set of inductors. In one embodiment, the impedance device 98 may be a passive 5 mH impedance inductor. Such impedance devices are generally used in, for example, terminal blocks of power supply modules for Fieldbus H1 networks, to effectively prevent the power supply, which is typically a voltage driven power supply, from trying to compensate for and eliminate the high frequency voltage signals on the Fieldbus segment. In operation, the impedance device 98 acts as a filter (with respect to the power supply 82) and prevents the digital signals on the segment 64, which are changing at a high rate of speed, from reaching the power supply 82 to thereby prevent the power supply 82 from trying to drive the segment 64 to a constant DC voltage at all frequencies.

Additionally, as illustrated in FIG. 4, a user selectable, high reliable termination network 100 may be provided within the terminal block 74 or, in some embodiments, may be provided outside of the terminal block 74 as an external element, to provide termination functionality within the Fieldbus network or segment 64. Such termination units 100 are typically used for impedance matching at the end of a Fieldbus network bus to prevent reflections on the segment or bus, to thereby provide for a high reliable communications over the bus.

Thus, as will be understood, the single integrated bus controller and power supply device 72 of FIG. 4 includes both a power supply and a bus controller disposed within the common housing 86, and this single device 72 provides both power signals and protocol control signals or functionality to the terminal block 74 and, from there, to a bus or segment 64 associated with a communication network. The integrated functionality provided by the device 72 thereby eliminates the need for separate housings for bus controllers and power supplies, reduces the cabinetry space and wiring needed to set up a bus powered network, reduces the wiring terminals typically needed for separate power supplies and controller cards, and makes set up and configuration of a bus powered communication network easier because it simplifies the design of and the interconnections within the communication network.

Figure 5:
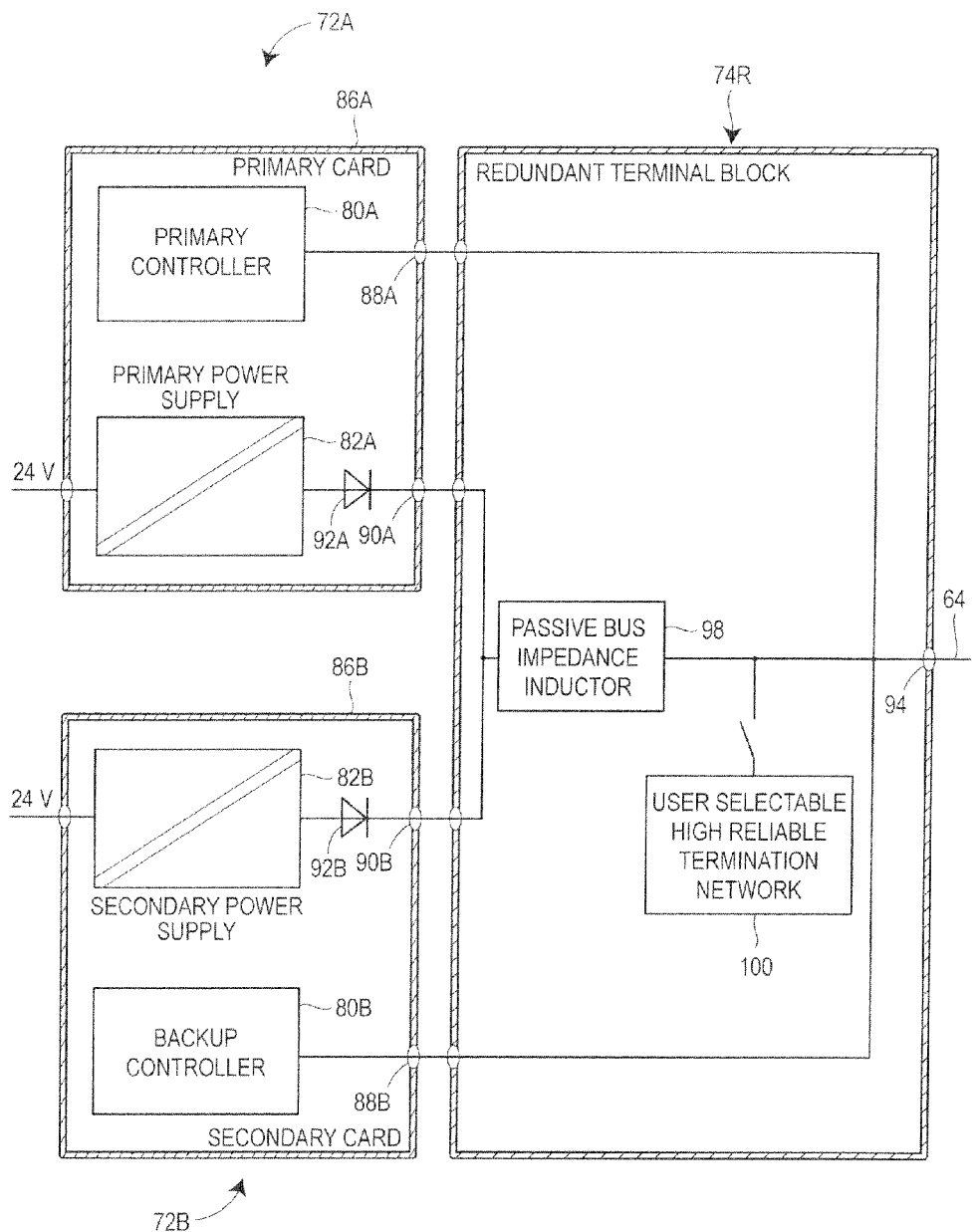
FIG. 5 depicts a block diagram of two of the integrated bus controller and power supply devices of FIG. 4 connected to a terminal block in a redundant configuration.

FIG. 5 illustrates two of the integrated bus controller and power supply devices 72 of FIG. 4, labeled as cards 72A and 72B, connected to a single terminal block 74R in a manner that forms a redundant controller and power supply configuration for the network 64. In particular, the redundant configuration of FIG. 5 provides for redundant power supply and controller functionality on a single bus segment 64. As will be noted from FIG. 5, the cards 72A and 72B are the same as that of FIG. 4, and can be easy connected in a redundant configuration using the simply configured terminal block 74R. More particularly, the primary redundant bus controller and a power supply device 72A includes a primary bus controller 80A connected to an output 88A of the device 72A, and includes a primary power supply 82A that is connected through a diode 92A to a power output 90A of the device 72A. Likewise, the backup or secondary integrated bus controller and power supply device 72B includes a backup bus controller 80B connected to an output 88B of the device 72B, and includes a backup power supply 82B that is connected through a diode 92B to a power output 90B of the device 72B. The redundant terminal block 74R includes inputs for accepting each of the two outputs of each of the primary and the secondary integrated bus controller and power supply devices 72A and 72B.

As illustrated in FIG. 5, circuitry within the terminal block 74R connects the, for example, Fieldbus segment bus 64 (connected at the output 94 of the terminal block 74R) directly to the control lines of both of the devices 72A and 72B. Additionally, the terminal block 74R connects the power signals from the primary power supply 82A and the secondary power supply 82B together (after the power signals have passed through the redundancy diodes 92A and 92B in the devices 72A and 72B) and this combined power signal is delivered to an input of the impedance device 98 disposed in the terminal block 74R. The output of the impedance block 98 is connected directly to the segment 64 via the output 94. Here, the impedance circuit 98 may be the same circuit as that described with respect to the terminal block 74 of FIG. 4 and so may be the same impedance circuit 98 used in the non-redundant configuration. In this case, the redundant terminal block 74R provides the same reverse impedance to the segment bus 64 whether the integrated bus controller and power supply devices 72A and 72B are connected in a redundant configuration (as shown in FIG. 5) or in a simplex or non-redundant configuration (as shown in FIG. 4).

Similar to the simplex terminal block 74 of FIG. 4, the redundant terminal block 74R includes a user selectable high reliable termination network 100 therein, which may be switched on or off as desired based on whether this termination network is needed for the network segment 64. As will be understood, the main difference between the redundant terminal block 74R and the simplex terminal block 74 basically lies in the fact that the redundant terminal block 74R includes additional inputs allowing for two power supply and two control signals to be connected thereto and the redundant terminal block 74R combines the controller signals and the power supply signals within the block 74R as illustrated in FIG. 5. As a result, the redundant terminal block 74R can be used in a simplex configuration simply by not using the inputs associated with, for example, the secondary integrated bus controller and power supply device 72B. In any event, in redundant configuration of FIG. 5, the power supply output of the primary integrated bus controller and power supply device 72A is connected to the power supply output of the secondary integrated bus controller and power supply device 72B inside the common terminal block 72R. Due to the common bus inductor 98, the bus impedance is independent of the chosen redundant or simplex configuration, and always provides the correct optimum bus impedance and termination. Moreover, the bus impedance inductor 98 may be designed for high reliability (e.g., may be formed from an inductor that is lacquered and that uses redundant pins to connect the inductor to the PCB to avoid a failure due to a broken solder-joint). The user selectable terminator 100 may also be a high reliable design using redundant components.

Figure 6:
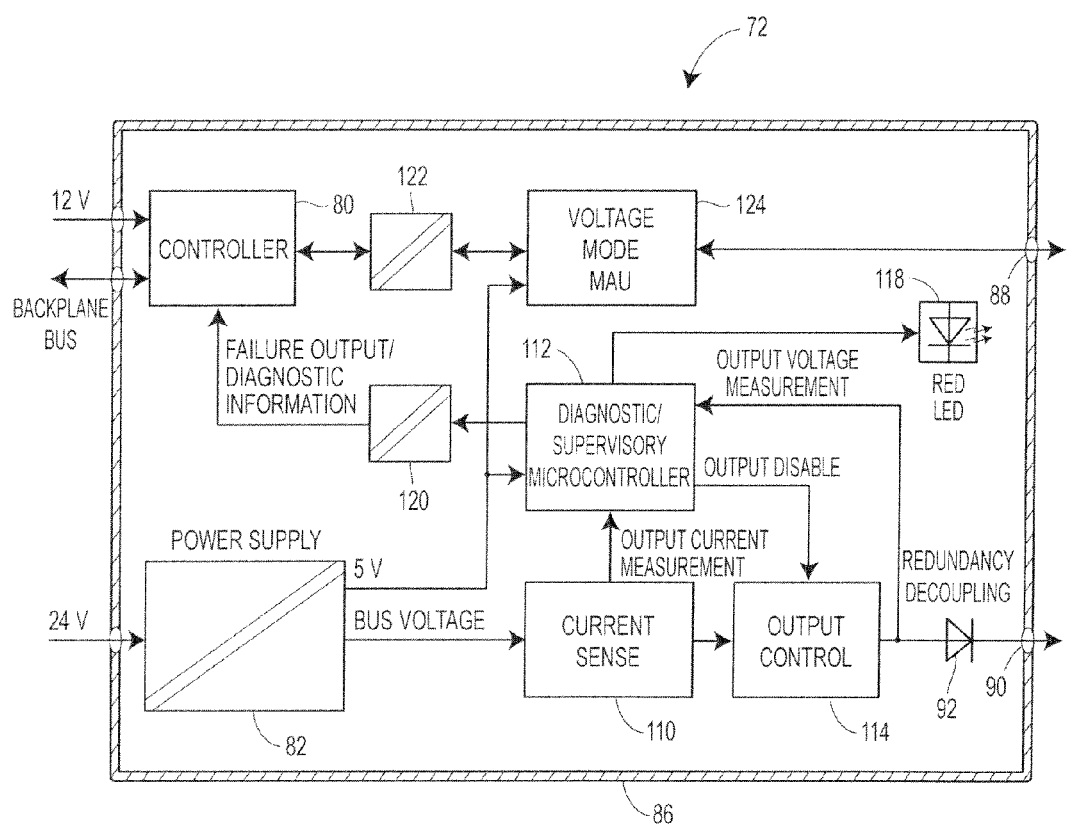
FIG. 6 depicts a more detailed block diagram of the integrated bus controller and power supply device of FIG. 4.

FIG. 6 illustrates a more detailed block diagram of the integrated bus controller and power supply device 72 of FIG. 4. In particular the integrated bus controller and power supply device 72 of FIG. 6 includes functionality that performs diagnostic activities and provides other information with respect to the operation of both of the bus controller 80 and the power supply 82 integrated within the single housing 86 of the device 72. As can be seen, the integrated card 72 includes the bus controller 80 and the power supply 82. Here, the controller 80 receives an external 12 volt DC power signal for powering the bus controller 80 from an external source, and connects to a backplane bus which may be, for example, connected to a process controller (e.g., the process controller 12 of FIG. 1), to other input/output devices, etc.

The power supply 82 receives an external 24 DC volt power signal and uses this signal to produce bus voltage to be provided to the bus 64, and additionally produces a 5 volt DC signal or other power signal to be used to power certain of the circuitry within the device 72. The bus voltage produced by the power supply 82 is provided through a current sense module 110 which operates to sense current flow out of the power supply 82. The current sense module 110 produces and provides a current measurement signal to a diagnostic supervisor microcontroller 112, which operates to provide supervisory diagnostic control of the power supply 82. In particular, the microcontroller 112 may perform diagnostics within the device 72 to assure proper current flow to the bus 64, i.e., current flow within established or rated ranges, based on the output of the current sense module 110. The bus power signal is also provided through the current sense module 110 to an output control switch 114, which may be any desired type of switching circuitry under the control of the diagnostic supervisor microcontroller 112. The output of the output control circuit 114 is provided back to the diagnostics and supervisory microcontroller 112 as an output voltage measurement or voltage sense.

The diagnostics and supervisory microcontroller 112, which is powered by the 5 volt DC signal produced by the power supply 82, uses the current measurement provided by the current sense module 110 and the voltage measurement provided at the output of the switch 114 to detect current and voltage problems, such as current overload, low or high voltage, fluctuating voltage, etc., any of which may be caused by failure of or problems within the power supply 82. Based on these measurements, the diagnostic supervisory microcontroller 112 may provide an output to the output control switch 114 to switch off or prevent flow of current and voltage from the power supply 82 to the power output 90 of the card 72. Thus, the diagnostic and supervisory microcontroller 112 may operate to prevent power from flowing through the diode 92 to the output 90 of the card 72 based on detected conditions within the device 72.

Still further, the diagnostics and supervisor microcontroller 112 may provide an output to drive a light emitting diode (LED) 118, which may be visible through the housing 86 of the card 72, to indicate the operational status of the power supply system within the device 72. Thus, in one example, the diagnostics and supervisory microcontroller 112 may cause the LED 118 to be lit whenever the power supply 82 is operating properly to supply power to the output 90 of the card 72, and may turn the LED 118 off when a problem has occurred or when the power supply 82 is not working properly.

Still further, the diagnostic and supervisory microcontroller 112 may provide one or more signals indicating a failure of the power supply 82 or other diagnostic information to the controller 80 through an isolation circuit 120. The isolation circuit 120 may be, for example, an optical isolation circuit or any other desired type of isolation circuit. The main purpose of this isolation circuit 120 is to prevent cross-talk between the two different channels implemented by the device 72 so as to prevent power signals or digital signals from one channel from bleeding over into the other channel as noise. In any event, the microcontroller 112 may perform monitoring to diagnose the functionality of the power supply by monitoring output voltage, output current, hardware condition (e.g., reference voltage) and this diagnostic information may be communicated by means of a discrete optically isolated output to a discrete input of the controller 80 within the housing 86. The conditions that may trigger an output to the controller 80 may include the detection of under voltage, over voltage, over current, a hardware malfunction, etc. The fault status may also be indicated using the red LED 118 (one of which is provided per power supply channel) according to Namur NE44. The design of the power supply system also allows providing a discrete output using a serial interface on the device 72 (not shown). This feature can be implemented on the device 72 to allow a supervisory system to access the detailed diagnostic information (e.g. total output current) from the device 72 at any desired time.

The communication between the microcontroller 112 and the process controller 80, which occurs within the same device housing 86, allows the bus controller 80 to operate better based on the diagnostic information provided by the microcontroller 112. In particular, the bus controller 80 can receive diagnostic information directly from the power supply circuitry in the same housing of the card 72, thereby receiving this information more quickly and being able to operate on this information immediately in order to, for example, switch over to a backup bus controller or take any other action on the bus 64 as necessary based on the diagnostic information from the microcontroller 112. Furthermore, the controller 80 may inform a user of problems via, for example, the backplane bus or other network to which a user is connected to the controller 80. Still further, because the bus controller 80 is powered from an external source, instead of from the power supply 82 within the housing 86, the bus controller 80 can continue to operate even when the associated power supply 82 fails.

As illustrated in FIG. 6, the bus controller 80 also communicates through a further isolation circuit 122 to a voltage mode Fieldbus media attachment unit or media access unit (MAU) 124, which performs voltage mode diagnostics and other activities with respect to the signals generated by or sent to the controller 80. The MAU 124 essentially implements the physical layer of the bus protocol communications. Again, the voltage mode MAU is located in the same housing 86 as the bus controller 80 and the power supply 82, and receives power (on the 5 volt line) from the power supply 82. The functionality of the voltage mode MAU is therefore tightly tied in with and coordinated with the operation of the controller 80 and the power supply 82 and the associated diagnostics. In any event, signals flowing between the controller 80 and the bus 64 are provided via or using the voltage mode Fieldbus MAU 124.

Importantly, the use of a voltage mode MAU 124, as opposed to a current-mode MAU, which is currently used in many H1 controller cards, reduces the power absorbed within the device 72, enabling the device 72 to dissipate enough heat to be able to have all of the components illustrated in FIG. 6 disposed in a common housing 86. In particular, in a Fieldbus system, it is possible to use a voltage mode MAU with a mean current consumption of 12 mA that is independent of the Fieldbus voltage. This operation results in a power dissipation of up to 720 mW in the Fieldbus MAUs at a bus voltage of 30 volts. In this case, a voltage-mode MAU, which is powered by a single internal 5 volt power supply, may be based on standard components. Moreover, such a discrete MAU meets the FF-831 Fieldbus specification on the transmit side and exceeds the specified jitter tolerances on the receive side by a typical factor of 2 (6.4 ps instead of 3.2 ps). In any event, the typical power consumption is up to less than one third of that consumed in a current mode MAU. As a result, the use of a voltage mode MAU reduces the power dissipation inside the device 72, in one case, by about 400 mW. This fact enables increasing the output current and improving the performance at the same time. The use of a voltage mode MAU may also significantly decrease the needed board area within the housing 86.

As noted above, all of the circuitry associated with both the bus controller 80 and the power supply 82, including the diagnostic and supervisory microcontroller 112, the current sense 110, the output control switch 114, the redundancy coupling circuit 92 and the LED 118 may be disposed on or may be connected to one circuit board within the housing 86, while the controller 80 and, if desired, the voltage mode Fieldbus MAU 124 may be disposed on a second circuit board within the housing 86 of the device 72. Here, the proximity of the different devices connected together in the same housing, without the need for external device to device connections as needed in the system of FIG. 2, provides for faster signaling between power supply and the control devices, and provides a single power source dedicated to a single controller which allows these two devices to operate together better than having these devices in separate housings or in separate cards which need to be connected separately based on different configurations set up by a user. Moreover, the power supply diagnostics are in the same device as the power supply and the bus controller, making the diagnostics more closely tied to the device itself. Still further, the integration of these three units in a single housing, and in particular in a housing having essentially the same size as the controller only cards 52 of FIG. 2, reduces the cabinetry and space associated with prior art network configurations as it reduces the number of separate hardware devices needed, as well as the number of terminal blocks needed to set up an I/O communication network. Generally speaking, the card 72 or the housing 86 will be of the same size as a typical controller card and will slide into the same cabinetry as a typical controller card. In particular, the card may be approximately 4 inches deep by 6 inches high by 1.5 inches wide.

As will be understood, the bus controller 80 operates as in interface device between a first network bus in the form of the Fieldbus segment bus 64 and a second network bus in the form of the backplane bus that establishes a network connection to the process controller 12 (FIG. 1). The bus controller 80 thus includes a first input/output line for connection to a first network bus (the bus 64) to provide bus based communication signals over the first network bus 64 and includes a second controller input/output line for connection to a second network bus (i.e., the backplane bus connected to the process controller 12). Additionally, as will be understood, the device 72 includes a first physical network interface disposed through the housing 86, that provides an appropriate electrical connection between the first bus controller input/output line and the bus 64. This first physical network interface may be formed by the terminal 88 and/or the MAU 124. The device 72 also includes a second physical network interface disposed through the housing 86 that provides an electrical connection between the second bus controller input/output line and the second network bus (e.g., the backplane bus). Using these connections and interfaces, the bus controller 80 operates as an interface device to transfer signals from the backplane bus to the network bus 64 or vice versa, putting these signals in the proper communication protocol on each of these network buses and taking other communication actions as needed. Thus, the bus controller 80 operates to enable devices on the bus 64 to communicate with the controller 12 and vice versa.

Figure 7:
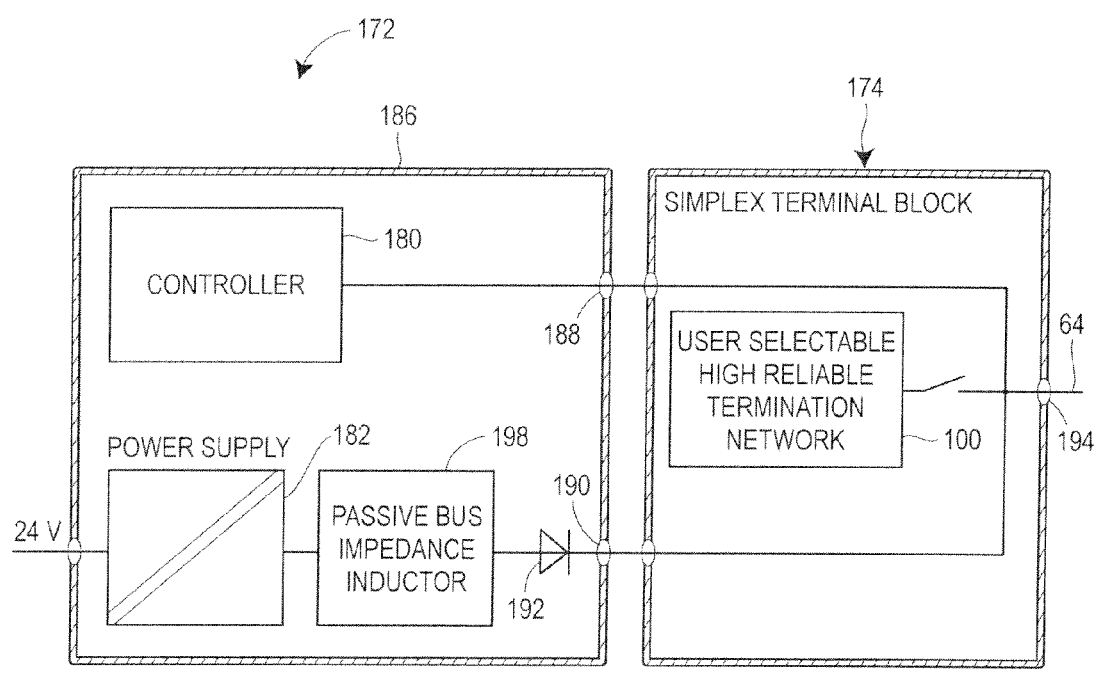
FIG. 7 depicts a block diagram of a second example of an integrated bus controller and power supply device connected to a terminal block.

FIG. 7 illustrates a generalized block diagram of a second embodiment of an integrated bus controller and power supply device 172 connected to a terminal block 174. In this case, the integrated bus controller and power supply device 172 includes a bus controller 180 connected to a bus controller output 188 and a power supply 182 connected to a power supply output 190 via a redundancy circuit element (e.g., a diode) 192. However, in this case, an impedance device 198 is also provided in the housing 186 of the device 172 and is disposed between the power supply 182 and the diode 192. As illustrated in FIG. 7, the simplex terminal block 174 includes wiring that connects the power supply line provided at the output 190 directly to the bus controller line provided at the output 188 and connects both of these signals directly to the network bus or segment 64. The simplex terminal block 174 may also include a user selectable high reliable termination network 100 which can be selectively connected to the bus 64, if desired. The configuration of FIG. 7, in which the impedance device 198 is disposed within the housing 186 of the integrated bus controller and power supply device 172, simplifies the terminal block 174, making connection of the device 172 to the network 64 very simple, as the terminal block 174 basically connects the two outputs 188 and 190 together and directly to the bus 64. In fact, if desired, this configuration could be simplified further by connecting the output of the bus controller 180 to the output of the diode 192 within the housing 186, so that the integrated device 172 provides a single output having both a power signal and a control signal thereon to the terminal block 174. This single output could then be connected through a single input on the terminal device 174 to the bus 64 and the termination network 100 within the terminal block 174, thereby further simplifying the terminal block 174. Of course, the integrated bus controller and power supply device 172 of FIG. 7 may include the diagnostics and other elements illustrated in FIG. 6, and the controller 180, the power supply 182, the diode 192 and the impedance device 198 may be the same as the corresponding elements described with respect to FIGS. 4-6.

Figure 8:
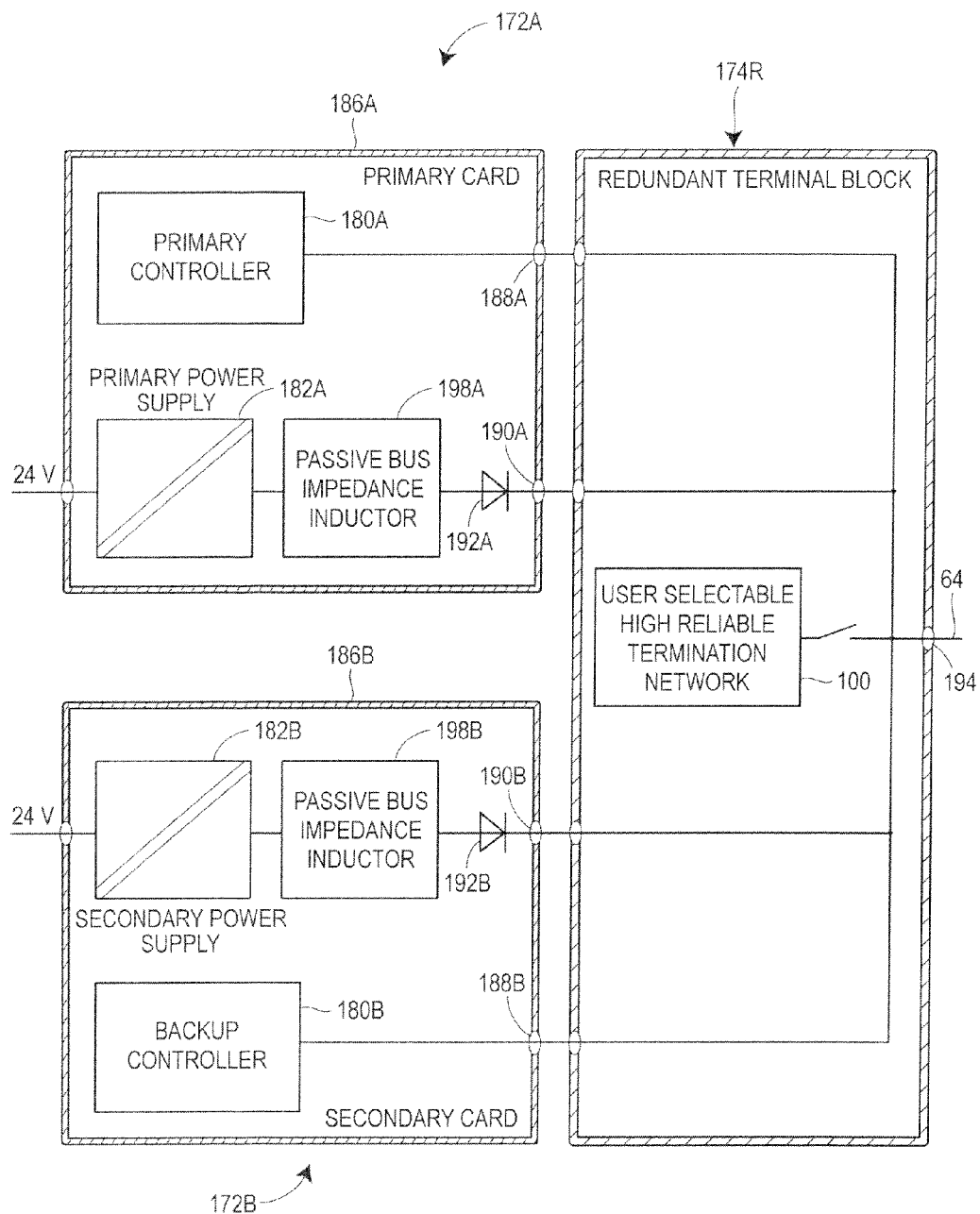
FIG. 8 depicts a block diagram of two of the integrated bus controller and power supply devices of FIG. 7 connected to a terminal block in a redundant configuration.

While the integrated bus controller and power supply device 172 and the terminal block 174 of FIG. 7 work well in a simplex network configuration, the integrated device 172 can also be connected in a redundant configuration, as illustrated in FIG. 8. In particular, the redundant configuration of FIG. 8 includes two of the integrated bus controller and power supply devices 172 (marked as devices 172A and 172B) having the same elements as the device 172 of FIG. 7. Here, however, a redundant terminal block 174R connects the power supply lines at the outputs 190A and 190B of the devices 172A and 172B and connects the bus controller signal lines at the outputs 188A and 188B of the devices 172A and 172B to each other and directly to the segment or bus 64. Additionally, the terminal block 174R includes a user selectable high reliable termination network 100, that can be connected to the bus or segment 64 as desired.

It is considered advantageous to use a passive inductor, for example, a 5 mH inductor, to implement the bus impedance device 198 (of FIG. 7) and the bus impedance devices 198A and 198B (of FIG. 8) as the reliability of a passive inductor is much higher in comparison to the reliability of an operational amplifier controlled gyrator circuit with a thermally stressed series transistor. Moreover, when using a gyrator circuit in the parallel redundant architecture of FIG. 8, it may also be necessary to provide a supervisory circuit for each of the two gyrators. Otherwise, a short circuit failure in one gyrator circuit will lead to a loss of the bus impedance, even if the system is redundant. In particular, the gyrator that fails with a short circuit will cause less voltage drop compared to the operating gyrator, and the redundancy diode at the output of the power supply with the failed gyrator will therefore conduct, thus shorting out the operating, healthy gyrator circuit. The use of a passive inductor network for the bus impedance device 198 eliminates this issue.

In any event, as long as the integrated bus controller and power supply device 172 is running in a simplex configuration (as shown in FIG. 7), the bus 64 is powered using one impedance inductor. However, in a redundant configuration, such as that of FIG. 8, the bus 64 is powered by a circuit having two impedance inductors disposed in parallel to each other. In particular, because the power signal lines from the devices 172A and 172B are connected together after the bus impedance devices 198A and 198B, the bus impedance devices 198A and 198B are connected in parallel to one another. As a result, if implemented by passive impedance circuitry, the impedance devices 198A and 198B will present a different impedance to the bus or segment 64 from the power supplies 182A and 182B when configured in the redundant configuration of FIG. 8 than the impedance presented to the segment 64 from a single power supply 182 associated with a single device 172 configured in the simplex configuration of FIG. 7. More specifically, the configuration of the device 172 of FIG. 7 involves a trade-off that, when used in a redundant configuration, both bus impedance inductors will run in parallel causing the bus inductance to be only half of the value of that in simplex configuration. In particular, assuming that the impedance of the devices 198A and 198B are equal to one another, the impedance seen by the network 64 in the redundant configuration of FIG. 8 will be about half of the impedance seen by the network 64 in the simplex configuration of FIG. 7 (because of the parallel connection of the impedance devices in FIG. 8).

To correct for or to compensate for this impedance difference, the impedance of the devices 198A may be changeable or alterable (e.g., by a switch) to make impedance seen by the network 64 the same in the redundant configuration of FIG. 8 as in the simplex configuration of FIG. 7. On the other hand, the impedance of the impedance devices 198A and 198B may be chosen so that, while the impedance seen by the network 64 is different in the redundant and simplex configurations, the value of the impedance seen in both cases is sufficient to provide appropriate filtering for the power supplies 182A and 182B to provide for adequate signal conditioning operation of the system in both the simplex and the redundant configurations. More particularly, in a Fieldbus embodiment, to meet the requirements of the FF-831 specification in simplex as well as in redundant mode, it may be necessary to compromise when selecting the values of the bus impedance inductors and the terminator 100 values. In particular, it may be necessary to increase the power feeding inductance of the device 198 to values greater than 5 mH (e.g., 6 to 7 mH) to ensure that, in a redundant configuration, the resulting inductance value is still in an acceptable range of 3 to 3.5 mH. To adjust the signal quality further, it may be desirable to increase the termination resistance or capacitance in the termination device 100 in a redundant configuration to compensate for the lack of a well-defined 5 mH bus impedance. This operation will generally require, however, that the terminator device 100 in the terminal block 174R be fixed, because allowing the use of an external terminator device 100 supplied by a user would leave the value of the termination impedance out of the control of the supplier. In any event, a requirement that the integrated bus controller and power supply device 172 be usable in both a simplex configuration and a redundant configuration results in a compromise related to bus impedance and resulting signal quality.

Figure 9:
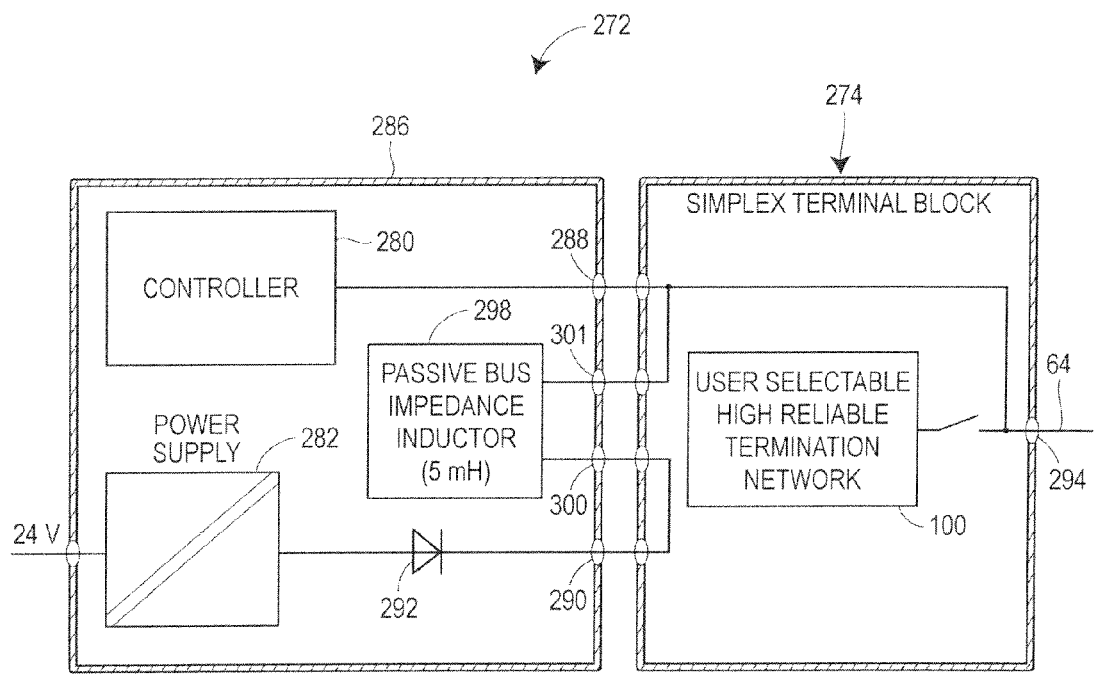
FIG. 9 depicts a block diagram of a third example of an integrated bus controller and power supply device connected to a terminal block.

FIG. 9 depicts a still different embodiment of an integrated bus controller and power supply device 272 that allows for impedance matching for the power supplies in both a simplex and a redundant configuration. As illustrated FIG. 9, the integrated bus controller and power supply device 272 is connected to a simplex terminal block 272. The device 272 includes a bus controller 280 connected to an output 288 of the device 272 and a power supply 282 connected through a redundancy diode 292 to a power supply output 290 of the device 272. Moreover, an impedance device 298, which may be a passive inductor network, for example, is disposed within the device 272 having two terminals connected to input/output terminals 300 and 301 disposed through the housing 286 of the device 272. As illustrated in FIG. 9, in the simplex configuration, the output of the power supply 280 in the device 272 is connected directly back to the input terminal 300 and is therefore connected to the input of the impedance device 298 through connections in the terminal block 274. Likewise, in this simplex configuration, the output of the impedance device 298 is connected through the output terminal 301 of the device 272 directly to the bus or segment 64 via connections within the terminal block 274. Here, again, the terminal block 274 may also include a user selectable high reliable termination network 100. In the configuration of FIG. 9, the impedance device 298 is disposed within the housing 286 of the integrated bus controller and power supply device 272, making connection and use of the terminal block 274 easy to configure, and allowing the terminal block 274 to have minimal components. Of course, the integrated bus controller and power supply device 272 of FIG. 9 may include the diagnostics and other elements illustrated in FIG. 6, and the controller 280, the power supply 282, the diode 292, and the impedance device 298 may be the same as the corresponding elements described with respect to FIGS. 4-6.

Figure 10:
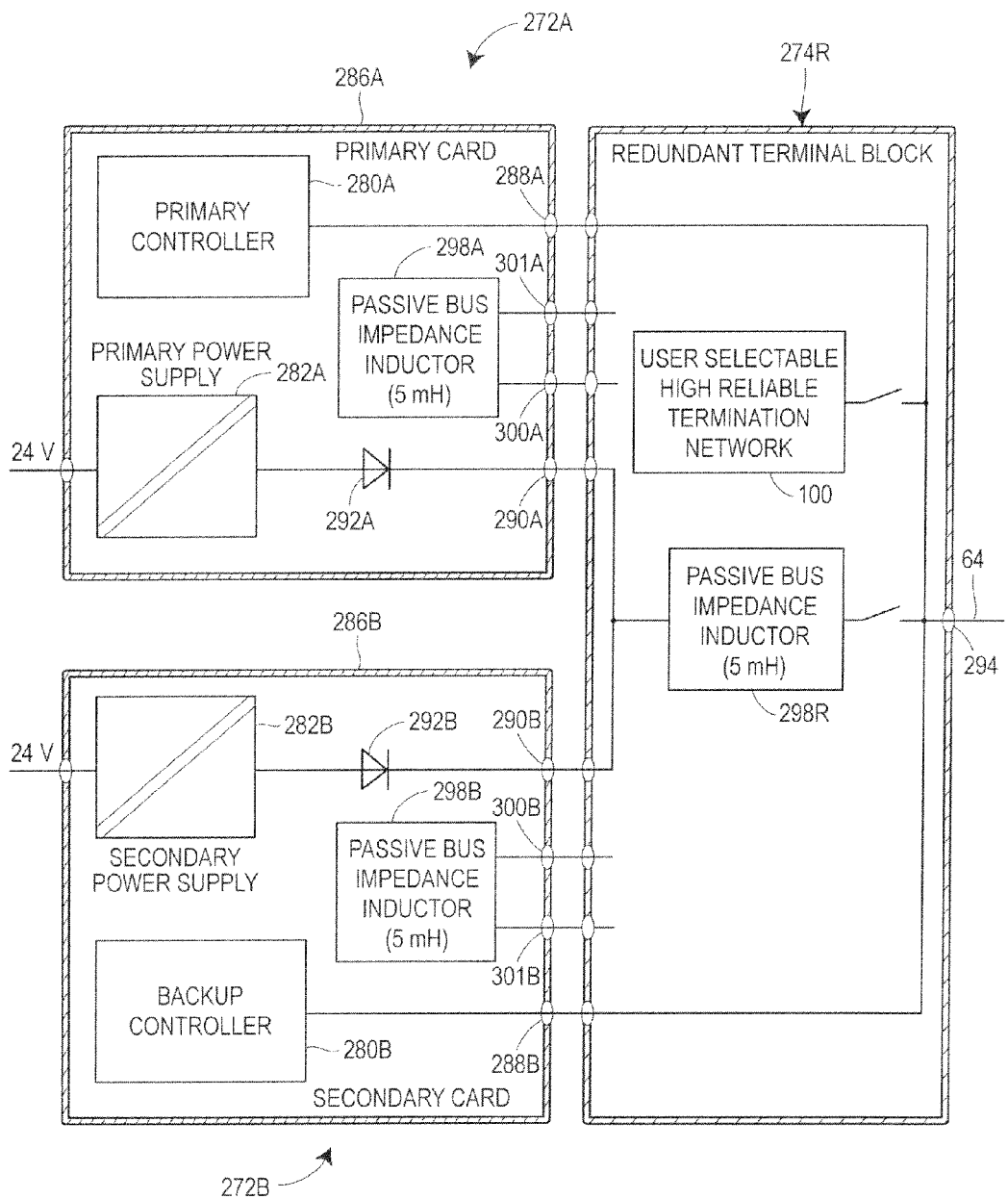
FIG. 10 depicts a block diagram of two of the integrated bus controller and power supply devices of FIG. 9 connected to a terminal block in a redundant configuration.

In a redundant configuration illustrated in FIG. 10, two of the integrated bus controller and power supply devices 272A and 272B are connected to a different terminal block 274R, which is configured differently than the terminal block 274 of FIG. 9. The elements of the devices 272A and 272B are the same as those of the device 272 of FIG. 9, but are indicated with an A or a B designation. Importantly, the terminal block 274R includes a single impedance device 298R, which may be same as the impedance devices 298A and 298B in the devices 272A and 272B. In this redundant configuration, the impedance devices 298A and 298B in the devices 272A and 272B remain unused and, instead, the outputs of the power supplies 282A and 282B are connected together to an input of the impedance device 298R within the terminal block 274R. In this case, because the power supplies 282A and 282B are connected through a single impedance device (instead of through parallel connected impedance devices as in FIG. 9), the network 64 sees the same impedance in both the simplex configuration of FIG. 9 and the redundant configuration of FIG. 10. Of course, the redundant terminal block 274R of FIG. 10 may include a user selectable high reliable termination network 100 which may be selectively connected to the bus 64. The configurations of FIGS. 9 and 10, while providing for a different terminal blocks 274 and 274R to be used in the simplex and redundant situations, provides for a same impedance in both situations, thus ensuring more reliable or optimal operation of the integrated bus controller and power supply devices 272A and 272*b* with respect to providing power on the bus or network 64.

Figure 11A:
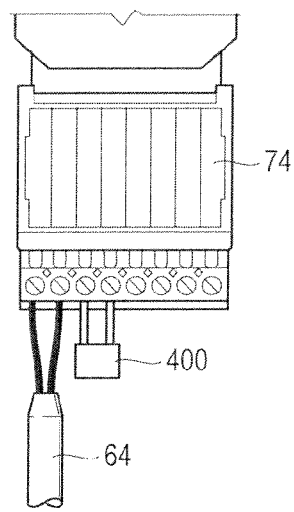
FIGS. 11A-11C depict three different manners of configuring a terminal block to implement a user selectable high reliable termination network for an I/O communication network.
Figure 11B:
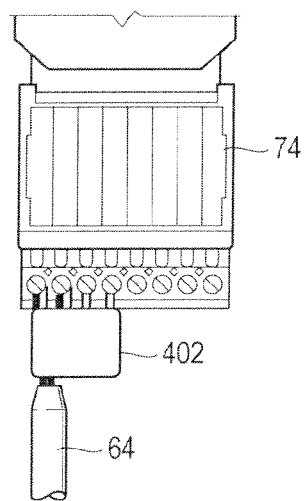
Figure 11C:
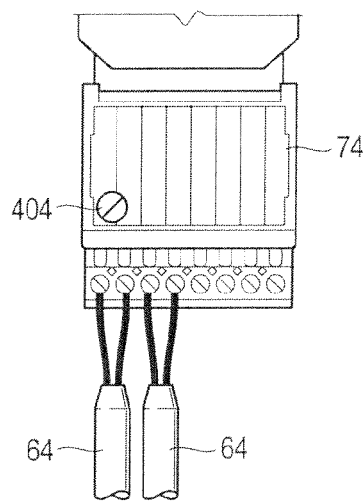

FIGS. 11A-11C illustrate three different manners in which the bus termination device 100 may be provided in or may be used in any of the configurations of FIGS. 4-10. In particular, FIGS. 11A-11C illustrate three concepts that are available to implement a user selectable bus termination device 100 for the bus segment 64. FIG. 11A illustrates the use of a two terminal screw-in link or jumper 400 disposed between or across two terminals on the terminal block 74. In this case, two unused terminals for each channel on the terminal block 74 may be used to activate a built in termination network 100 (not shown in FIG. 11A), and this activation may be engaged by the use of the external jumper 400 to connect the built-in termination device 100 to the bus 64. The use of the jumper 400 makes the engagement of the high reliable termination network 100 clearly visible. If desired, the link or jumper 400 can be installed as a default and can be removed if demanded by the user. In this case, the terminal block 74 may contain high reliable passive components only.

FIG. 11B illustrates the use of a screw-in, over-molded external terminator 402 as the terminal device 100. In this case, the termination circuitry of the terminal device 100 is disposed in the external terminator 402 and is connected directly to the bus 64 via terminal posts on the terminal block 74. The bus segment has four terminals (two (+) terminals and two (−) terminals) on the terminal block 74, and the terminal device 402 (which generally only has passive components therein, such as resistors and capacitors) may implement a terminal device for two separate channels. The four prong terminator 402 may be connected to unused terminals if the integrated bus controller and power supply card is installed at the beginning of the trunk wherein two of the screw-terminals on the terminal block 74 will remain unused. In this case, the externally installed terminator device 402 is highly reliable and clearly visible.

FIG. 11C illustrates the case in which a rotary switch 404 (the actuation mechanism of which is only shown) is disposed on or inside the terminal block 74 and is used to connect an internal termination device 100 (not shown in FIG. 11C) to the bus 64. Activation of the rotary switch 404 may be used to connect or disconnect the internal termination device 100 to or from the bus 64. This option is less visible and is therefore less reliable, especially when use of the terminal block 74 demands G3 conformance (i.e., operation in highly corrosive environments).

It has been found that the designs of the integrated bus controller and power supplies disclosed herein can be implemented to meet the typical design requirements for bus powered Fieldbus networks, such as Fieldbus H1 networks, while achieving a heat dissipation load within the tolerance of a typical controller only device, (e.g., a typical H1 bus controller only card). Moreover, these designs, for both simplex and redundant configurations, can be made without impacting signal quality, robustness and heat loading over known devices for these networks. In fact, the lower power dissipation of these devices enables increased packing density inside control room cabinets, and the compact design thus saves control room cabinet space. Still further, the use of passive power conditioning units (e.g., passive inductor networks for the devices 98, 198 and 298), ensures long service life and ensures the best Fieldbus signal for reliable data transmission. Still further, these designs can be implemented in a Fieldbus design based on and using existing H1 bus controller only card electrical designs, requiring no changes or modifications to the firmware of these devices.

Still further, in a Fieldbus implementation, the designs can be made without causing a significant change in the size of the device housing over that of a typical H1 bus controller only card, because the addition of the power supply can be made without increasing the power consumption in the combined device in a manner that requires a change in the size of the housing. Thus, for example, the integrated bus controller and power supply devices 72, 172 and 272 described herein may be implemented in a Fieldbus network in a housing of the size of approximately 4 inches, by 6 inches by 1.5 inches.

The power dissipation caused by a typical existing Fieldbus H1 bus controller only card is 3 watts. This power is fully dissipated inside the housing of the current or typical Fieldbus H1 bus controller only card. Moreover, the existing MAU is powered from the H1 bus and the average current in the MAU is 12 mA. This power is also fully dissipated inside the H1 bus controller only card housing and the total power dissipation caused by the MAUs is calculated as VFB*2*12 mA (e.g., 672 mW at 28 V). Here, the maximum allowed total power dissipation in the Fieldbus H1 bus controller card housing is 7.5 W at 70° C. ambient temperature. These heat dissipation design criteria can be meet with the new integrated bus controller and power supply devices described herein. Moreover, the existing implementation of the Fieldbus H1 bus controller only card provides one discrete input per segment, and these inputs can be used by the new integrated designs described herein to signal fault conditions from the power supply.

In addition to power dissipation and signal quality, circuit space is an important issue in designing the integrated bus controller and power supply devices described herein. It is assumed that a maximum power dissipation of 7.5 W in a typical Fieldbus H1 bus controller card housing leads to a temperature rise from 70° C. to 85° C. inside the card housing. Furthermore, it is assumed that the bus controller circuit has a mean power dissipation of about 3 W (12 V*250 mA). Each of the two integrated Fieldbus MAUs of the bus controller card draws a current of 12 mA from the Fieldbus network, resulting in additional power dissipation inside the card housing of 0.672 W at 28 V or 0.72 W at 30 V Fieldbus voltage for both Fieldbus MAUs. Therefore, the maximum power dissipation for each of the two integrated Fieldbus power supplies may be as high as 1.914 W, providing an output voltage of 28 V or 1.89 W providing an output voltage of 30 V. Thus, the common power conditioning impedance design suggested herein produces an output voltage of 28-30 V at a maximum output current of 450 mA, resulting in a minimum power of 12.6 W that is supplied to the Fieldbus segment. The maximum resulting power dissipation inside the integrated bus controller and power supply card housing will be about 7.18 W, in which 2*1.93 W is used for the Fieldbus power supplies including diagnostics, 2*0.16 W is used for the voltage mode MAUs, and 3 W is used for the bus controller circuit. This leaves headroom of about 320 mW to the maximum allowed power dissipation of 7.5 W inside the card housing. The maximum power dissipation inside the terminal block will be about 0.53 W (2*1.3 ohms*450 mA$^2$). The output voltage of the power supply is safely limited to 32 V according to IEC60079-15 and IEC60079-11 standards. This limit may be achieved by applying safety factors on the voltage limiting components and by applying the applicable distances in the layout. This configuration also allows using the integrated controller and power supply card in combination with approved segment protectors for Ex ic or Ex nL rated applications.

The power supply efficiency of a standard power supply for a Fieldbus network is typically 90% at room temperature and 24 V input voltage. The worst-case efficiency is about 87.5% over the specified input voltage range between 19.2 and 35 volts and temperature range between −40° C. and 70° C. If the power conditioning inductors are built into integrated bus controller and power supply card housing, the power dissipation of the power conditioning inductors needs to be taken into account when calculating the card power dissipation. This is not the case if the power conditioning inductors are built into the terminal block.

For the case in which the power conditioning inductors are located in the housing, the series resistance of the power conditioning inductor is typically 1 Ohm (±30% over temperature), depending on the size of the conditioner coil. Table 1 below provides some examples for output voltage/current pairs, which are reasonable for the integrated bus controller and power supply. The stated losses are losses inside the integrated bus controller and power supply housing.

TABLE 1

| | Inductor in terminal block? | | | |
|---|---|---|---|---|
| | No | Yes | No | Yes |
| Output voltage | 26-28 V | 26-28 V | 28-30 V | 28-30 V |
| Output current | 420 mA | 450 mA* | 400 mA | 445 mA |
| Worst-case power supply losses | 1.68 W | 1.80 W | 1.71 W | 1.91 W |
| Worst-case power conditioner losses | 0.23 W | 0.00 W | 0.21 W | 0.00 W |
| Worst-case total losses per supply | 1.91 W | 1.80 W | 1.92 W | 1.91 W |

*Maximum output current limited by the size of the conditioning inductor.

As can be seen from Table 1, it is possible to provide for sufficient heat dissipation in the housing when the power conditioning inductor (i.e., the impedance device 98) is provided in the housing of the card 72.

As noted above, there are two general concepts for generating appropriate Fieldbus impedance in a power supply to decouple the DC voltage from the AC bus signal including the use of an active gyrator circuit and the use of a passive 5 mH impedance inductor. The active gyrator circuit needs a typical voltage drop of about 2.5 volts to provide acceptable bus impedance, even if only one terminator 100 is active on the bus. Most likely, standard circuits need an even higher voltage drop especially at higher current demands. This fact results in a typical power loss of 1 W (2.5 V*400 mA) for the active gyrator circuit compared to a much smaller power dissipation in the passive 5 mH inductor of typically 0.16 W (1 ohm*400 mA$^2$).

Moreover, a common bus impedance configuration saves one inductor (and inductors are a significant contribution to cost). The signal quality of both the common and parallel bus impedance is good, so that the availability of the power is high in both passive configurations. Using a common bus impedance inductor with redundant solder connections provides the same availability as using redundant inductors related to high impedance failures of the power conditioner. However, an inter-winding short circuit in one inductor will always cause an interruption of bus communication because the resulting impedance is zero if one inductor fails short circuit in a parallel bus impedance configuration. The probability of an inter-winding short circuit or the mechanical cracking of an inductor core is only half when using a common bus impedance configuration as opposed to using a parallel bus impedance configuration.

Installing the power conditioner inductor inside the terminal block additionally reduces the dissipated power inside the integrated bus controller and power supply card allowing higher output power or reduced temperature rise inside the housing, and providing a higher availability. As a result, it may be best to use a common inductor installed in the terminal block if space inside the terminal block is available to do so. If it is impossible for any reason to place an inductor inside a terminal block, it may be necessary to control the impedance in a way that leaves the Fieldbus impedance unaffected by the redundancy configuration. This configuration can be achieved by actively switching between the inductors in the redundant power supplies or by using the or-ing elements in the power supplies to control the impedance.

As noted above, the proposed design of the integrated bus controller and power supply card uses galvanically isolated power supplies which generate regulated output voltages of typically 30 V to power the Fieldbus segments and 5 V to power the internal circuitry and the voltage mode Fieldbus MAU. As also noted above, the monitoring of the Fieldbus power is performed by a secondary side microcontroller in the housing. The output voltage, output current and hardware status is continuously monitored and any error condition is signaled to the bus controller via a galvanically isolated discrete output (or an optional serial link to transfer more detailed diagnostic information). A red LED for each segment additionally indicates the status of each Fieldbus power supply to the user. Moreover, the Fieldbus signal is processed using a voltage mode MAU which, as noted above, reduces power dissipation inside the integrated bus controller and power supply card housing in comparison to a traditional current mode MAU. The voltage mode MAU also improves jitter tolerance. This configuration thus enables increasing the output power of the Fieldbus power supplies.

Moreover, if desired, an advanced diagnostics functions device, such as a Pepperl+Fuchs Advanced Diagnostic Module (ADM) for FOUNDATION® Fieldbus may be used as a stand-alone module that can be wired to a powered Fieldbus network. In this case, a set of terminals may be provided on the integrated bus controller and power supply device to enable connection of the ADM directly into the integrated card. This connection could be provided either as a discrete input that communicates the alarm status of the ADM or as a connection to the serial communication port of the integrated card.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention. Thus, for example, while the integrated bus controller and power supply device described herein have been described for particular use with a Fieldbus H1 network, they could be used with other bus based I/O communication networks that include or provide bus power including, for example, ASI and DeviceNet networks.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A communication network device for use in simultaneously providing a bus based communication signal and a power signal on a bus of a communication network, comprising:
   a housing;
   a bus controller disposed in the housing, the bus controller including a controller input/output line to provide bus based communication signals;
   a bus power supply disposed in the housing, the bus power supply producing a power signal for providing power via a first bus to multiple devices that are connected to the first bus external to the housing,
      the first bus capable of simultaneously carrying the power signal from the bus power supply and the communication signals from the bus controller; and
   an output in the housing to which the first bus may be connected, the output providing a connection to the bus controller input/output line and to the power supply so that the power signal and the communication signals are simultaneously transmitted over the first bus when the first bus is connected to the bus controller and the bus power supply by way of the output.

2. The communication network device of claim 1, further including a redundancy or-ing circuit disposed in the housing between the bus power supply and output.

3. The communication network device of claim 2, wherein the or-ing device is a diode.

4. The communication network device of claim 1, wherein the output includes a first terminal disposed through the housing, the first terminal connected to the bus controller input/output line, and a second terminal disposed through the housing, the second terminal connected to receive the power signal from the bus power supply.

5. The communication network device of claim 1, further including a bus impedance device disposed within the housing.

6. The communication network device of claim 5, wherein the bus impedance device includes a passive inductor network.

7. The communication network device of claim 5, wherein the bus impedance device includes a gyrator circuit.

8. The communication network device of claim 5, wherein the output includes a first terminal disposed through the housing, the first terminal connected to the bus controller input/output line, a second terminal disposed through the housing, the second terminal connected to receive the power signal from the bus power supply, a third terminal disposed through the housing, the third terminal connected to a first side of the bus impedance device and a fourth terminal disposed through the housing, the fourth terminal connected to a second side of the bus impedance device.

9. The communication network device of claim 1, further including a diagnostics unit disposed in the housing, the diagnostics unit connected to the bus power supply to perform one or more diagnostic actions on the bus power supply.

10. The communication network device of claim 9, wherein the diagnostics unit includes a microcontroller and a current sense unit connected to sense current output by the bus power supply, the current sense unit coupled to the microcontroller.

11. The communication network device of claim 9, wherein the diagnostics unit includes a microcontroller and a voltage sense connected to sense voltage output by the bus power supply, the voltage sense coupled to the microcontroller.

12. The communication network device of claim 9, wherein the diagnostics unit includes a microcontroller coupled to the power supply to detect one of a current fault and a voltage fault, and wherein the diagnostics unit further includes a switch coupled to interrupt the power signal output by the power supply from reaching output when a current fault or a voltage fault is detected.

13. The communication network device of claim 12, wherein the microcontroller is coupled to the bus controller to provide diagnostic information to the bus controller.

14. The communication network device of claim 12, further including a media attachment unit disposed in the housing and coupled between the bus controller and output.

15. The communication network device of claim 14, wherein the media attachment unit is a voltage mode media attachment unit.

16. The communication network device of claim 15, wherein the power supply produces a second power signal that powers the media attachment unit and provides the second power signal to the media attachment unit within the housing.

17. The communication network device of claim 16, further including an electrical isolation unit disposed between the media attachment unit and the bus controller.

18. The communication network device of claim 1, further including a terminal block disposed outside of the housing, the terminal block including a terminal block input for connection to output in the housing and a terminal block output for connection to the first bus.

19. The communication network device of claim 18, further including a second housing, a second bus controller disposed in the second housing, the second bus controller including a further bus controller input/output line for connection to the first bus to provide bus based communication signals over the first bus, a second bus power supply disposed in the second housing, the second bus power supply producing a second power signal for the first bus and a second output in the second housing, the second output providing a connection to the second bus controller input/output line and to the second power supply, wherein the terminal block further includes a second terminal block input for connection to the second output in the second housing, and wherein the terminal block output is connected to receive a power signal from either the bus power supply or the second bus power supply and is connected to the bus controller input/output line and to the second bus controller input/output line.

20. The communication network device of claim 19, further including a bus impedance device disposed in the terminal block.

21. The communication network device of claim 20, wherein the bus impedance device includes a first impedance device input connected to receive the power signal and connected to receive the second power signal, and wherein the bus impedance device includes a bus impedance output connected to the terminal block output.

22. The communication network device of claim 19, wherein the terminal block includes a bus termination device for matching impedance on the first bus.

23. A communication network interface device for use in interfacing between a first network bus of a first input/output communication network and a second network bus of a second communication network, comprising:
a housing;
a bus controller disposed in the housing for providing bus based communication signals over a first network bus capable of simultaneously carrying the bus based communication signals and a power signal, the bus controller including:
a first controller input/output line for connection to the first network bus to provide the bus based communication signals over the first network bus, and
a second controller input/output line for connection to a second network bus, wherein the bus controller operates as an interface device between the first network bus and the second network bus;
a bus power supply disposed in the housing, the bus power supply producing the power signal for providing power via the first network bus to multiple devices that are connected to the first network bus and located external to the housing;
a first physical network interface disposed through the housing, the first physical network interface providing an electrical connection between the first bus controller input/output line and the first network bus; and
a second physical network interface disposed through the housing, the second physical network interface providing an electrical connection between the second bus controller input/output line and the second network bus.

24. The communication network device of claim 23, wherein the first input/output communication network is a Fieldbus network and the bus controller implements a Fieldbus communication stack to implement Fieldbus communications on the first network bus.

25. The communication network device of claim 23, wherein the second network bus couples the bus controller to a process controller that executes a process control routine using a device coupled to the first network bus.

26. The communication network device of claim 23, wherein the bus controller receives a power signal from the second network bus via the second physical network interface to power the bus controller.

27. The communication network device of claim 23, wherein the bus controller is isolated from the bus power supply by an isolation circuit.

28. The communication network device of claim 23, further including a bus impedance device disposed within the housing.

29. The communication network device of claim 28, wherein the bus impedance device is electrically connected between the bus power supply and the first physical network interface.

30. The communication network device of claim 23, further including a diagnostics unit disposed in the housing, the diagnostics unit connected to the bus power supply to perform one or more diagnostic actions on the bus power supply.

31. The communication network device of claim 30, wherein the diagnostics unit includes a microcontroller and a current sense unit connected to sense current output by the bus power supply, the current sense unit coupled to the microcontroller.

32. The communication network device of claim 30, wherein the diagnostics unit includes a microcontroller and a voltage sense connected to sense voltage output by the bus power supply, the voltage sense coupled to the microcontroller.

33. The communication network device of claim 30, wherein the diagnostics unit includes a microcontroller coupled to the power supply to detect one of a current fault and a voltage fault, and wherein the diagnostics unit further includes a switch coupled to interrupt the power signal output by the power supply from reaching the first network bus when a current fault or a voltage fault is detected.

34. The communication network device of claim 33, wherein the microcontroller is coupled to the bus controller to provide diagnostic information to the bus controller.

35. The communication network device of claim 23, further including a media attachment unit disposed in the housing and coupled between the bus controller and the first physical network interface.

36. The communication network device of claim 35, wherein the media attachment unit is a voltage mode media attachment unit.

37. A communication network control system for use in providing communication signals and a power signal on a bus of a communication network, comprising:
a terminal block including one or more inputs and including an output for connection to a bus, of a communication network, that is capable of simultaneously transmitting power and facilitating communication;
a first bus controller device including:
a first housing;
a first bus controller disposed in the first housing, the first bus controller including a first controller input/output line for connection to one of the inputs of the terminal block to provide bus based communication signals to the bus via the terminal block; and
a first bus power supply disposed in the first housing, the first bus power supply (i) producing a first power signal for providing power via the bus to multiple devices that are connected to the bus and located external to the first housing and (ii) including a first bus power supply output for connection to one of the inputs of the terminal block to provide the first power signal to the bus via the terminal block; and
a second bus controller device including:
a second housing;
a second bus controller disposed in the second housing, the second bus controller including a second controller input/output line for connection to one of the inputs of the terminal block to provide bus based communication signals to the bus via the terminal block; and
a second bus power supply disposed in the second housing, the second bus power supply (i) producing a second power signal for providing power via the bus to multiple devices that are connected to the bus and located external to the second housing and (ii) including a second bus power supply output for connection to one of the inputs of the terminal block to provide the second power signal to the bus via the terminal block;
wherein the terminal block electrically couples the first controller input/output line and the second controller input/output line to the bus and electrically couples the first bus power supply output and the second bus power supply output to the bus.

38. The communication network control system of claim 37, wherein the terminal block includes a bus impedance device having an input and an output, and wherein the first bus power supply output and the second bus power supply output are coupled to the input of the bus impedance device and the output of the bus impedance device is coupled to the bus.

39. The communication network control system of claim 38, wherein the bus impedance device comprise a passive inductor network.

40. The communication network control system of claim 37, wherein the first bus controller device includes a first impedance device coupled between the first bus power supply output and one of the inputs of the terminal block to condition the first power signal, wherein the second bus controller device includes a second impedance device coupled between the second bus power supply output and one of the inputs of the terminal block to condition the second power signal and wherein the terminal block connects the conditioned first and second power signals together to the bus.

41. The communication network control system of claim 37, wherein the first bus controller device includes a first impedance device to be coupled between the first bus power supply output and one of the inputs of the terminal block via a first external electrical connection to condition the first power signal, wherein the second bus controller device includes a second impedance device to be coupled between the second bus power supply output and one of the inputs of the terminal block via a second external electrical connection to condition the second power signal, and wherein the terminal block includes a third impedance device to be connected to the first bus power signal and to the second bus power without the first bus power signal being conditioned by the first impedance device and without the second bus power signal being conditioned by the second impedance device.

42. The communication network control system of claim 37, wherein the terminal block includes a bus termination device for matching impedance on the bus.

* * * * *